United States Patent Office 2,897,675
Patented Aug. 4, 1959

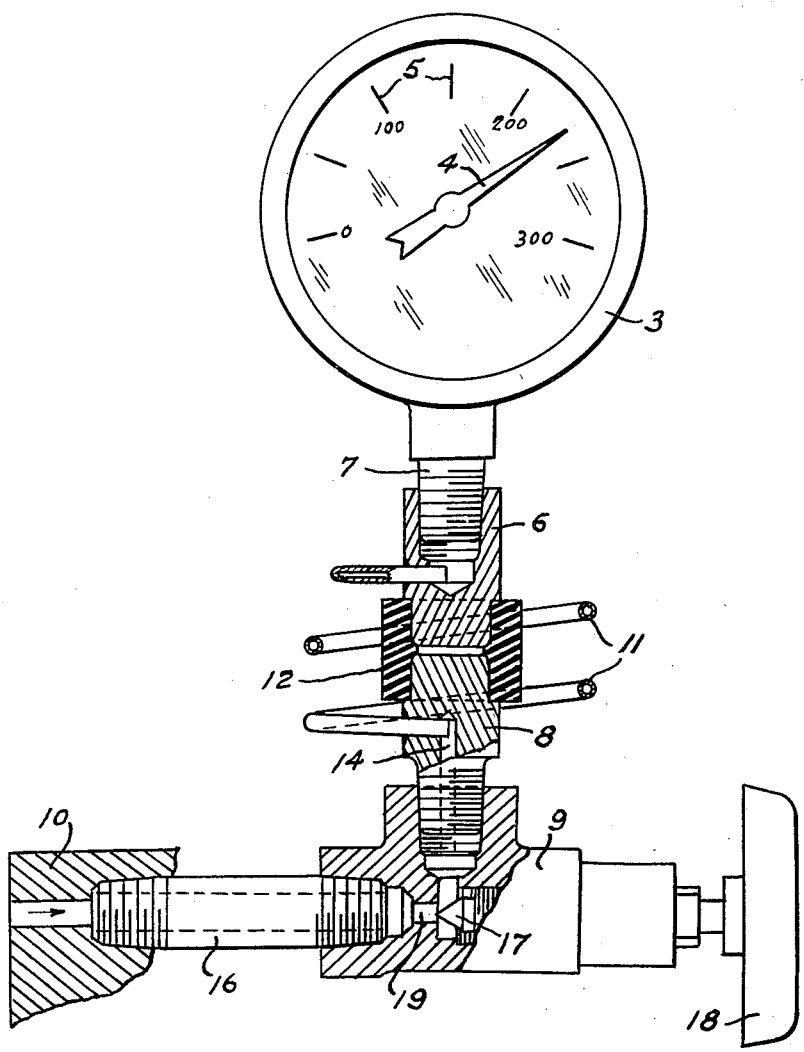

2,897,675

GAUGE MOUNTING

Erich J. Kocher and Sylvester A. Tomkowiak, Milwaukee, Wis., assignors to The Vilter Manufacturing Co., Milwaukee, Wis., a corporation of Wisconsin Application May 15, 1957, Serial No. 659,403

3 Claims. (Cl. 73—420)

The present invention relates in general to improvements in devices for facilitating accurate recording by gauges, and it relates more specifically to an improved mounting for gauges of the type having a movable indicator cooperable with indicia on the face of the gauge to display the readings which the guage is intended to portray.

The primary object of our invention is to provide an improved gauge mounting which will facilitate reading of the gauge with utmost accuracy.

When gauges of the type having a movable or oscillatory member such as a pointer cooperable with a series of indicia on the face of the gauge, are supplied with pulsating actuating medium or are mounted directly upon supporting structure which is subject to jarring or vibration, the pointer frequently partakes of objectionable secondary movement and swings or oscillates back and forth throughout a considerable range, thus making it difficult to obtain accurate readings. While various attempts have heretofore been made in efforts to obviate this difficulty, none of these have proven entirely satisfactory in preventing sudden impacts, pressure pulsations and vibrations from reaching the gauges, and thus effecting accurate performance of the indicator at all times.

It is therefore an important object of the present invention to provide an improved mounting for gauges of the type having a movable or oscillatory indicator cooperable with relatively fixed indicia, and wherein transmission of objectionable movement from the gauge support or actuating pressure source to the indicator is effectively eliminated.

Another important object of this invention is to provide a simple but highly efficient assemblage for supporting a gauge which may be subject to considerable actuating media pulsation, shock and vibration, but in which transmission of such objectionable disturbances is automatically prevented from adversely affecting the guage readings.

A further important object of the invention is to provide an improved gauge mounting device embodying a flexible helical conductor for the gauge actuating media interposed between the gauge and its primary actuating source and support, and which is adapted to protect the gauge from pulsation and vibration emanating from such source or support.

Still another important object of this invention is to provide an improved shock, pulsation and vibration dampener for mounting a gauge which is subject to sudden pulsation, vibration or shock.

An additional object of our invention is to provide an effective vibration and shock absorbing gauge mounting adapted for cooperation with gauges of various types.

These and other more specific objects and advantages of the invention will be apparent from the following detailed description.

A clear conception of the features constituting our present improvement and of a practical embodiment of the invention in one type of gauge, may be had by referring to the drawing accompanying and forming a part of this specification wherein the various structural parts are provided with suitable reference characters.

The single figure of the drawing is a part sectional elevation of a typical Bourdon tube pressure gauge having one of the improved mountings applied thereto, the section having been taken centrally and vertically through the major portion of the mounting assemblage.

While the invention has been shown and described herein as having been embodied in a mounting for a specific type of pressure gauge, it is not intended to restrict the use thereof to such gauges; and it is also contemplated that descriptive terms employed herein be given the broadest possible interpretation consistent with the disclosure.

Referring to the drawing, the improved gauge and mounting assemblage shown therein by way of illustration, comprises in general a gas pressure actuated gauge 3 having an oscillatory indicating member or pointer 4 cooperable with a series of indicia 5 on the adjacent face of the gauge; an upper mounting element or coil fitting 6 secured to the bottom gas inlet 7 leading to the pointer actuating mechanism of the gauge 3; a lower mounting element or coil fitting 8 secured to a primary support or gas supply valve 9 carried by structure 10 from which the gas is derived; a flexible conduit or helical tube 11 connecting the fittings 6, 8 and providing a vibration absorbing spring and gas pulsation eliminating conduit for the gauge unit; and a resilient shock absorber or buffer block 12 also interconnecting the fittings 6, 8 and providing an auxiliary soft cushion support for the gauge.

The gauge 3 may be of the Bourdon tube or any other well known type having an indicator such as a pointer 4 movable in response to variations in an actuating medium such as gas under pressure derived from diverse sources, and the fittings 6, 8 may be formed of metal while the flexible conduit tube 11 may also be formed of metal and has its upper and lower ends soldered or welded to the fittings 6, 8 respectively. This tube 11 may be spirally or helically wound to provide a spring of sufficient strength to carry the weight of the gauge 3 but also of sufficient flexibility to prevent transmission of vibrations from the structure 10 and valve 9 to the gauge unit, and the internal diameter of the tube 11 should be such that it will automatically effect a limited range of control for extreme variations in the gauge actuating pressure. The inlet 7 of the gauge 3 is attached to the upper fitting 6 in open communication with the upper end of the tube 11 while the lower end of this tube is in open communication with a passage 14 in the fitting 8 leading to the gas supply and shut-off valve 9, and the lower fitting 8 is likewise attached to the body of this control valve 9.

The adjacent ends of the fittings 6, 8 are cylindrical and spaced apart, and the shock absorber or damper block 12 may be formed as a sleeve of very soft and resilient rubber, adapted to snugly embrace the adjacent fitting ends but to maintain these fittings 6, 8 constantly separated. This buffer block 12 thus applied provides an auxiliary soft cushion support for the gauge 3 and also prevents swaying of the gauge 3 due to harmonic vibration resulting from external influences, but must be sufficiently flexible and resilient to avoid interfering with the vibration absorbing and pulsation preventing action of the helical tube 11.

The pressure media supply valve 9 is rigidly secured to the structure 10 from which the media is derived, by means of a nipple 16, and has a needle 17 adjustable by a hand wheel 18 and cooperable with a port 19 in the valve body to control the delivery of pressure to the gauge 3. The pressure medium such as gas may be derived from various sources, and the mounting of the valve 9 on the structure 10 from which the gas is derived is such that any vibration or shock which emanates from the structure 10 will be imparted to the valve 9 and lower coil fitting 8 through the rigid nipple 16. When no gauge readings are desired the valve 9 may be manipulated with the aid of the hand wheel 18 to seal the port 19, but this hand wheel may also be manipulated to take care of gas supply pressure ranges beyond those which are automatically effected by the size of the tube 11.

When the improved gauge mounting has been properly constructed and assembled as hereinabove described, its normal functioning is substantially as follows. With the valve 9 closed, no fluid pressure will be delivered to the gauge 3, but when the needle 17 is retracted from the port 19 as shown in the drawing, then fluid under pressure can flow through the passage 14, helical tube 11 and gauge inlet 7 to cause the pointer 4 to oscillate and cooperate with the indicia 5 on the face of the gauge 3. If during such normal use of the gauge assemblage, the actuating gas pressure pulsates excessively or the structure 10 is subjected to vibration for any cause, the helical tube 11 will positively prevent undesirable oscillation from being imparted to the pointer 4, thereby causing this pointer to assume a steady recording movement free from objectionable vibratory oscillation. If on the other hand, the structure 10 or the valve 9 are subjected to sudden impact which might possibly be transmitted through the helical tube 11, then the buffer block 12 will function to promptly absorb the shock resulting from such impact and will also prevent the needle 4 from oscillating as a result of the impact. This buffer block 12, however, also acts to eliminate possible harmonic vibration of the gauge 3 due to external influences of any type, and it also serves to maintain fittings 6, 8 spaced apart, but this block may be omitted in some cases. The improved mounting assemblage therefore functions to automatically and effectively prevent undesirable oscillation of the pointer 4 which might result from pressure pulsation, vibration or impact imparted to the gauge 3 and thus insures accurate reading of the gauge.

From the foregoing detailed description of the construction and operation of the improved gauge mounting assemblage, it must be apparent that the device in fact functions in a highly effective manner to eliminate undesirable movement of the gauge needle or pointer 4 due to disturbances in the stability of the primary gauge pressure supply and supporting structure. The resilient tube 11 performs the dual function of a capillary tube valve for dampening gas pressure pulsations and of absorbing vibrations from the primary support; while the buffer block 12 serves the triple purpose of absorbing impact and harmonic vibration of the gauge 5 and of spacing the fittings 6, 8 apart. The device is extremely simple and compact in construction and can obviously be produced at moderate cost for use in conjunction with various types of gauges, and the invention has in fact gone into highly satisfactory and successful commercial use. It is also noteworthy that either the flexible helical tube 11, or the buffer block 12, may be advantageously utilized alone, and that the valve 9 may serve only as a shut-off device, but when the two supports are utilized in conjunction with each other, each serves to carry at least a portion of the dead weight of the gauge 3.

It should be understood that it is not desired to limit this invention to the exact details of construction and operation of the gauge mounting herein specifically shown and described, for various modifications within the scope of the appended claims may occur to persons skilled in the art.

We claim:

1. In a mounting for a gauge having an oscillatory indicating pointer cooperable with indicia on the face of the gauge, a primary mounting fitting having therein a passage communicable with a source of gauge actuating media, a secondary mounting fitting carried by the gauge in spaced relation to said primary fitting and having therein a passage for transmitting gauge actuating media to oscillate the pointer, a helical flexible tube providing a passage connecting said fitting passages and partially supporting the gauge, and a resilient buffer block interconnecting said fittings independently of said tube and providing an auxiliary soft cushion support for the gauge, said buffer block being disposed within the helix of said tube and having a passageway therethrough to maintain the space between said fittings.

2. In a mounting for a gauge having an oscillatory indicating pointer cooperable with indicia on the face of the gauge, a primary mounting fitting having therein a passage communicable with a source of gauge actuating media, a secondary mounting fitting carried by the gauge in spaced relation to said primary fitting and having therein a passage for transmitting gauge actuating media to oscillate the pointer, a helical and resilient vibration absorbing conduit connecting said fitting passages, and a tubular flexible shock absorber coacting with said fittings independently of said conduit, said shock absorber being disposed within the conduit helix.

3. In a mounting for a gauge having an oscillatory indicating pointer cooperable with indicia on the face of the gauge, a primary mounting fitting having therein a passage communicable with a source of gauge actuating media, a secondary mounting fitting carried by the gauge in spaced relation to said primary fitting and having therein a passage for transmitting gauge actuating media to oscillate the pointer, a metallic helical spring tube providing a restricted conduit connecting said fitting passages, and a soft rubber shock absorber coacting with said fittings independently of said tube to maintain the fittings spaced apart, said shock absorber being disposed within the conduit helix.

References Cited in the file of this patent

UNITED STATES PATENTS

| | | |
|---|---|---|
| 18,578 | Eastman | Nov. 10, 1857 |
| 445,355 | McNeil | Jan. 27, 1891 |
| 1,087,883 | Loomis | Feb. 17, 1914 |
| 1,622,843 | Price et al. | Mar. 29, 1927 |
| 1,895,802 | Klyce | Jan. 31, 1933 |
| 1,904,615 | Bristol et al. | Apr. 18, 1933 |
| 1,941,613 | McDonell | Jan. 2, 1934 |